United States Patent Office 3,496,213
Patented Feb. 17, 1970

3,496,213
MONO-CYANOETHYLATION OF AROMATIC AMINES WITH AN AQUEOUS ZINC CHLORIDE CATALYST
John M. Ross, Cooper Farm, Wilmington, Del., assignor to E. I. du Pont de Nemours and Company, Wilmington, Del., a corporation of Delaware
No Drawing. Filed July 11, 1967, Ser. No. 652,406
Int. Cl. C07c *121/78*
U.S. Cl. 260—465            6 Claims

ABSTRACT OF THE DISCLOSURE

An improved process for preparing mono-N-cyanoethyl aromatic amines from an aromatic amine and acrylonitrile which comprises carrying out the reaction in the presence of zinc chloride in an aqueous reaction medium. The products are useful as intermediates in organic syntheses.

BACKGROUND OF THE INVENTION

Field of the invention

This invention relates to an improved process for preparing N-cyanoethyl derivatives of aromatic amines from acrylonitrile and an aromatic amine.

Description of the prior art

Aromatic amines do not react readily with acrylonitrile in cyanoethylation processes, and a catalyst is ordinarily employed to facilitate the reaction. The reaction has been carried out with glacial acetic acid as the catalyst (U.S. 2,492,972) or with various metal salts including zinc acetate or cuprous chloride in glacial acetic acid [Braunholtz and Mann, J. Chem. Soc. (1953) 1817.] However, the use of acetic acid, with or without the salts, is not entirely satisfactory for several reasons. Firstly, a mixture of products is obtained. Not only are di-cyano as well as monocyano derivatives formed, but also acetyl derivatives may be obtained. Secondly, in a number of reactions, adequate yields can be obtained only at elevated temperatures and under autogenous pressure, necessitating the use of expensive equipment. Considerable attention must also be paid to careful temperature control due to the possibility of exothermic reactions, generation of excessive pressures, and a tendency in many cases for the reaction temperature to increase with time to excessive levels.

The reaction has also been carried out by employing a strong acid in an aqueous solution (U.S. 3,231,601). The strong acids used are mineral acids or strong organic acids. This procedure requires the presence of high volumes of water in order to maintain the acid at a suitable low concentration; and moreover, salt formation between the aromatic amine reactant and the acid decreases the yield since the salt of the aromatic amine does not react with acrylonitrile. In addition, sterically hindered aromatic amines, such as o-toluidine or N-methylaniline, are less reactive and must be reacted under autogenous pressure at elevated temperatures for optimum results by this procedure.

As will be seen below, the process of this invention overcomes the deficiencies of the art processes.

SUMMARY OF THE INVENTION

This invention is directed to a process for preparing N-cyanoethyl aromatic amines which comprises reacting (1) an aromatic amine, preferably one that may be substituted in the nucleus with lower alkyl, lower alkoxy, hydroxy, halogen or additional amino groups, and in which the nitrogen of the amino groups may be mono-substituted with lower alkyl or hydroxy lower alkyl,
(2) acrylonitrile, in the presence of zinc chloride in an aqueous medium.

The process of the invention produces mono-N-cyanoethylated aromatic amines in high yield and purity. Side reactions are minimized and the reaction conditions are easily controlled. Not only is the aqueous system of the invention economical, but it provides ease of temperature control and retards polymerization of the acrylonitrile. Moreover, the zinc chloride catalyst exerts a greater catalytic effect upon the less-reactive aromatic catalysts, and is more effective. In addition, autogenous pressures are not required, even with sterically hindered aromatic amines.

DESCRIPTION OF THE INVENTION

As discussed above, the process for reacting an aromatic amine with acrylonitrile is known. The aromatic amines are usually those of the benzene, biphenylene, or naphthalene series, i.e., mono- or di-carbocyclic amines which may contain lower alkyl, lower alkoxy, hydroxy, halogen or amine substituents. Preferably, the aromatic amines contain, if any, one such substituent and are of the benzene series. Thus the aromatic amines may be mono- or di-amino compounds. In addition, the aromatic amines may be primary or secondary amines, i.e., the amino-nitrogen may have a lower alkyl or hydroxy lower alkyl substituent. Examples of aromatic amines which may be cyanoethylated by the process of this invention include aniline, o-, m- and p-anisidine, o-, m- and p-toluidine, o-, m- and p-chloroaniline, o-, m- and p-aminophenol, N-methylaniline, N-ethylaniline, N-propylaniline, N-butylaniline, N-2-hydroxyethylaniline, N-methyl-m-toluidine, N-ethyl-m-toluidine, p-isopropylaniline, N-2-hydroxyethyl-p-methoxyaniline, o-, m- and p-phenylenediamine, dianisidine and benzidine.

The aromatic amine, acrylonitrile, water and zinc chloride are heated together in a reaction vessel, preferably at reflux temperature under an atmosphere of nitrogen for about 2 to 30 hours. Both time and temperature depend upon the reactivity of the aromatic amine. In general, the temperature will range from between 25° and 105° C. The reaction mass is cooled whereupon the product crystallizes and is filtered, or the organic layer is separated and impurities are removed by distillation.

One mole of acrylonitrile is preferably employed for one mole of monoamine, or two moles, if a diamine is reacted, i.e., at least one mole of acrylonitrile is required for each gram mole of amino group in the aromatic amine. An excess of acrylonitrile, about 10%, is preferred to compensate for the possibility of some loss due to polymerization and possible evaporation.

The amount of zinc chloride employed is between about 0.025 to 0.25 mole per mole of amine, and is preferably 0.1 to 0.2 mole.

The quantity of water is kept to a practical minimum volume and is generally about equal to the volume of acrylonitrile used, i.e., 20–40% by wt. of $H_2O$/total charge. In some instances, isopropanol is an acceptable reaction medium, for example, when the aromatic amine is o-chloroaniline.

Although not necessary, a polymerization inhibitor such as hydroquinone, or an amine solubility promoter, can be added if desired.

The examples which follow illustrate the process of the invention in further detail, but are not to be considered as limiting the invention in any manner. Unless otherwise indicated, parts are by weight.

Example 1.—N-cyanoethylaniline

A mixture of 140 parts of aniline, 88 parts of water, 20 parts of granular zinc chloride and 110 parts of acrylonitrile was heated under reflux under a nitrogen atmosphere for 28 hours. The temperature rose gradually from 80 to 94° C. On cooling to room temperature the initial upper layer of oil crystallized. The crystals were collected, washed with water and dried giving 199 g. (90.5% of theory) of N-cyanoethylaniline, M.P. 49–50° C. Recrystallization from methanol gave colorless crystals, M.P. 50–50.5° C.

Example 2.—N-cyanoethyl-o-methoxyaniline

A mixture of 184 parts of o-anisidine, 88 parts of water, 35 parts of zinc chloride and 125 parts of acrylonitrile was heated under reflux under a nitrogen atmosphere 15 hours, at which time the reaction temperature had increased from 83° to 99° C. The organic layer was separated from the cold reaction mass and washed twice with 200 parts of 1% hydrochloric acid. The crude washed product was topped to a pot temperature of 125° C. at 10 mm. Hg pressure giving 230.5 parts of N-cyanoethyl-o-anisidine, $n_D^{25}$ 1.5580. The purity of this product was determined by vapor phase chromatography to be 93.7%. Yield of the product was 82% of theory.

Example 3.—N-cyanoethyl-p-aminophenol p-Aminophenol (110 parts) was added to a mixture of 64 parts of acrylonitrile and 20 parts of zinc chloride in 110 parts of water. The agitated slurry was raised to boiling and held under a nitrogen atmosphere under reflux for 4 hours. The reaction mass was cooled to 25–30° C. and the crystallized product was collected and washed with 100 parts of 1% hydrochloric acid. The dried product, N-cyanoethyl-p-aminophenol, had a melting point of 78–84° which was raised to 86.5–88.5° C. on one recrystallization from methanol.

Example 4.—N-cyanoethyl-N-methylaniline

N-methylaniline (160.5 parts), 88 parts of acrylonitrile, and 20 parts of zinc chloride in 110 parts of water were heated under gentle reflux under a nitrogen atmosphere for 21 hours until the reaction temperature held steady at 95° C. The organic layer was separated from the crude reaction mass and washed twice with 200 parts of 0.7% hydrochloric acid. The washed product was topped under 10 mm. Hg pressure to a pot temperature of 125° C. giving 196 parts of N-cyanoethyl-N-methylaniline, $n_D^{25}$ 1.5589. Purity by vapor phase chromatography was 97.2%. A yield of 79.5% of theory was obtained.

Example 5.—N-cyanoethyl-N-ethyl-m-toluidine

A solution of 35 parts of zinc chloride in 110 parts of water was treated with 202.5 parts of N-ethyl-m-toluidine and 100 parts of acrylonitrile. The mass was raised to boiling and held under reflux under a nitrogen atmosphere until a constant temperature of 99° C. was attained. The product was isolated and topped as described in the previous example giving 231 parts of N-cyanoethyl-N-ethyl-m-toluidine, $n_D^{25}$ 1.5446. The purity as determined by vapor phase chromatography was 98.6%, and the yield was 80.7% of theory.

Example 6.—N-cyanoethyl-N-hydroxyethylaniline 2-anilinoethanol (1222 parts) was heated under reflux under a nitrogen atmosphere with 630 parts of acrylonitrile and 180 parts of zinc chloride in 675 parts of water. After 16 hours the reaction temperature had increased from 80 to 88° C. The cooled reaction mass was diluted with 3000 parts of 1% hydrochloric acid and the organic layer separated and washed again with 3000 parts of 1% hydrochloric acid. The isolated product, N-cyanoethyl-N-hydroxyethylaniline (1670 parts) contained 8.1% moisture by Karl-Fisher analysis and had an organic purity of 98.4% by vapor phase chromatography. A yield of 89% of theory was obtained.

It has been shown by the above examples that excellent yields of monocyanoethylated amines are obtained by the use of zinc chloride as the catalyst. In addition, highly pure products are easily recovered from the reaction mixture without extensive purification.

By replacing the aromatic amines used in the examples with any other aromatic amine described herein, the corresponding N-cyanoethyl aromatic amine can be obtained.

The N-cyanoethylated aromatic amine products of the invention process are useful as intermediates in the preparation of other useful products. They are especially useful as coupling components in the preparation of azo dyes for paper and synthetic fibers as described, for example, in U.S. 2,492,972.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing mono-N-cyanoethyl aromatic amines which comprises treating (1) an aromatic amine selected from mono- or di-carbocyclic amines which can contain substituents on the carbocyclic nucleus selected from lower alkyl, lower alkoxy, hydroxy, halogen or amino and wherein any amino-nitrogen present in the amine can be substituted with a lower alkyl or a hydroxy lower alkyl group, with (2) acrylonitrile in an amount of at least one mole of acrylonitrile per mole of amino group in the aromatic amine, at a temperature of between about 25° C. and 105° C., in an aqueous medium in which the amount of water employed is about 20% to about 40% by weight of the total reaction charge, and in the presence of between about 0.025–0.25 mole zinc chloride per mole of aromatic amine, followed by separation of the mono-N-cyanoethyl aromatic amine.

2. The process of claim 1 wherein the amount of water present is about equal to the volume of the acrylonitrile present.

3. The process of claim 1 wherein the aromatic amine is an aniline that can be substituted as described in claim 1.

4. The process improvement of claim 1 wherein the aromatic amine is N-methylaniline.

5. The process improvement of claim 1 wherein the aromatic amine is N-hydroxyethylaniline.

6. The process improvement of claim 1 wherein the aromatic amine is N-ethyl-m-toluidine.

References Cited

UNITED STATES PATENTS

| | | |
|---|---|---|
| 1,992,615 | 2/1935 | Hoffmann et al. |
| 2,492,972 | 1/1950 | Dickey. |
| 2,726,945 | 12/1955 | Heininger _____ 260—465 X |
| 3,231,601 | 1/1966 | Peterli. |

FOREIGN PATENTS 941,109 11/1963 Great Britain.

OTHER REFERENCES

American Cyanamid Co., The Chemistry of Acrylonitrile, New York, p. 22, 1959.

Braunholtz et al.: J. Chem. Soc., pp. 1817–1824, 1953.

Kirk-Othmer: Encyclopedia of Chemical Technology, vol. 6, pp. 634, 635, 636, 643, 1965.

Adams et al.: Organic Reactions, vol. V. pp. 79 and 82–87, 1952.

CHARLES B. PARKER, Primary Examiner

S. T. LAWRENCE III, Assistant Examiner